United States Patent
Hu

(10) Patent No.: US 10,287,033 B2
(45) Date of Patent: May 14, 2019

(54) UNMANNED AERIAL VEHICLE TAKE-OFF AND LANDING CONTROL SYSTEM AND CONTROL METHOD

(71) Applicant: GoerTek Technology Co., LTD., Qingdao, Shandong Province (CN)

(72) Inventor: Tengfei Hu, Qingdao (CN)

(73) Assignee: GOERTEK TECHNOLOGY CO., LTD., Qingdao (CN)

(*) Notice: Subject to any disclaimer, the term of this patent is extended or adjusted under 35 U.S.C. 154(b) by 0 days.

(21) Appl. No.: 16/060,888

(22) PCT Filed: Dec. 22, 2016

(86) PCT No.: PCT/CN2016/111573
§ 371 (c)(1),
(2) Date: Jun. 8, 2018

(87) PCT Pub. No.: WO2017/114295
PCT Pub. Date: Jul. 6, 2017

(65) Prior Publication Data
US 2019/0009926 A1  Jan. 10, 2019

(30) Foreign Application Priority Data

Dec. 31, 2015  (CN) .......................... 2015 1 1014413

(51) Int. Cl.
*B64F 1/10* (2006.01)
*B64F 1/04* (2006.01)
(Continued)

(52) U.S. Cl.
CPC .............. *B64F 1/04* (2013.01); *B64C 39/024* (2013.01); *B64F 1/02* (2013.01); *B64F 1/362* (2013.01);
(Continued)

(58) Field of Classification Search
CPC .. B64F 1/04; B64C 2201/18; B64C 2201/088
See application file for complete search history.

(56) References Cited

U.S. PATENT DOCUMENTS 9,540,121 B2 * 1/2017 Byers .................... B64C 39/024
9,561,871 B2 * 2/2017 Sugumaran ............. B64C 25/32
(Continued)

FOREIGN PATENT DOCUMENTS

| CN | 1483634 A | 3/2004 |
|---|---|---|
| CN | 101671988 A | 3/2010 |

(Continued)

OTHER PUBLICATIONS

Japan First Office Action corresponding to Japanese Application No. 2018-534568, dated Nov. 28, 2018.
(Continued)

*Primary Examiner* — Brian M O'Hara
(74) *Attorney, Agent, or Firm* — Arent Fox LLP

(57) ABSTRACT

Disclosed is an unmanned aerial vehicle take-off and landing control system and a control method. The system comprises a magnet assembly at the side of an unmanned aerial vehicle and a magnetic field assembly at the side of a parking platform. An electrified coil is provided in the magnetic field assembly and current is supplied into the coil. A magnetic field is generated by the magnetic field assembly, to form a thrust force acting on the unmanned aerial vehicle. A resultant force is formed by the thrust force and a lift or resistance force in the process of take-off or landing of the unmanned aerial vehicle to supplement the lift force or resistance. In this process, the current in the coil is changed to form a uniform magnetic field, the thrust force acting on the unmanned aerial vehicle is generated to supplement the lift force or the resistance.

9 Claims, 2 Drawing Sheets

(51) Int. Cl.
*B64F 1/02* (2006.01)
*B64C 39/02* (2006.01)
*B64F 1/36* (2017.01)
*H01F 7/20* (2006.01)
*H02J 7/02* (2016.01)
*H02N 15/00* (2006.01)

(52) U.S. Cl.
CPC .............. *H01F 7/202* (2013.01); *H02J 7/025* (2013.01); *H02N 15/00* (2013.01); *B64C 2201/021* (2013.01); *B64C 2201/066* (2013.01); *B64C 2201/088* (2013.01); *B64C 2201/18* (2013.01); *B64C 2201/208* (2013.01)

(56) References Cited

U.S. PATENT DOCUMENTS

| | | | |
|---|---|---|---|
| 9,845,165 | B2 * | 12/2017 | Michalski ................. B64F 1/36 |
| 2011/0315810 | A1 | 12/2011 | Petrov |
| 2015/0251561 | A1 | 9/2015 | Konigorski et al. |
| 2015/0276353 | A1 | 10/2015 | Ueno et al. |
| 2016/0144982 | A1 | 5/2016 | Sugumaran |
| 2017/0038778 | A1 * | 2/2017 | Wang ................... G05D 1/0676 |

FOREIGN PATENT DOCUMENTS

| | | |
|---|---|---|
| CN | 201633925 U | 11/2010 |
| CN | 101992856 A | 3/2011 |
| CN | 202193207 U | 4/2012 |
| CN | 202848035 U | 4/2013 |
| CN | 103879563 A | 6/2014 |
| CN | 203937865 U | 11/2014 |
| CN | 104503459 A | 4/2015 |
| CN | 204297116 U | 4/2015 |
| CN | 204297122 U | 4/2015 |
| CN | 105059539 A | 11/2015 |
| CN | 105667768 A | 6/2016 |
| CN | 205366055 U | 7/2016 |
| DE | 102015206844 A1 | 11/2015 |
| EP | 2899128 A1 | 7/2015 |
| JP | 61-113598 A | 5/1986 |
| WO | 2013132114 A1 | 9/2013 |

OTHER PUBLICATIONS

European Patent Office Search Report corresponding to European Application No. EP 16881084.4, dated Sep. 28, 2018.
International Search Report issued in PCT Application No. PCT/CN2016/111573 dated Mar. 14, 2017.
Office Action issued in Chinese Patent Application No. 201511014413.6 dated Apr. 28, 2017.

* cited by examiner

UNMANNED AERIAL VEHICLE TAKE-OFF AND LANDING CONTROL SYSTEM AND CONTROL METHOD

CROSS REFERENCE TO RELATED APPLICATIONS

This application is a National Stage entry of International Application No.: PCT/CN2016/111573, filed on Dec. 22, 2016, which claims priority to Chinese Patent Application No. 201511014413.6, filed on Dec. 31, 2015. The disclosure of the priority applications are hereby incorporated in their entirety by reference.

TECHNICAL FIELD

The present disclosure relates to the technical field of unmanned aerial vehicles, and particularly relates to an unmanned aerial vehicle take-off and landing control system and control method.

BACKGROUND

Unmanned aerial vehicles are extensively used in various fields such as spying/surveillance, communications relay, electronic countermeasure, disaster prevention and control, and emergency search. It is even proposed to use an unmanned aerial vehicle in a car as its moveable "eyes". When the unmanned aerial vehicle does not work, it parks in a landing platform on the roof of the car and may be wirelessly charged simultaneously. When the unmanned aerial vehicle works, it is controlled to scout the traffic ahead and may also act as the camera of the backing radar of the car.

However, due to the work environment, air flow or high operation difficulty, the above proposal is still unachievable. A critical problem is that unmanned aerial vehicles are prone to fall due to collision or inclining in the process of take-off or landing, which results in short lives and low practical applicability of unmanned aerial vehicles. Furthermore, when unmanned aerial vehicles are taking off, the wing will consume a great deal of electrical energy to leave the landing platform, which is not good for sustained use.

SUMMARY

The present disclosure provides an unmanned aerial vehicle take-off and landing control system and control method, which can solve the problem that unmanned aerial vehicles are vulnerable to damage in the process of take-off or landing.

The unmanned aerial vehicle take-off and landing control system according to the present disclosure comprises:
a magnet assembly provided at the side of the unmanned aerial vehicle; and
a magnetic field assembly provided at the side of a landing platform,
wherein an electrified coil is provided in the magnetic field assembly;
the electrified coil is supplied with a current, and the magnetic field assembly generates a supporting magnetic field at the side of the landing platform, to form a thrust force that acts on an unmanned aerial vehicle; and
a resultant force is formed by the thrust force and a lift force of the unmanned aerial vehicle in the process of take-off or landing of the unmanned aerial vehicle or a resistance force that acts on the unmanned aerial vehicle, to supplement the lift force or the resistance force.

Preferably, the unmanned aerial vehicle take-off and landing control system further comprises a rotational speed measuring device, a distance measuring device and a controller; the rotational speed measuring device measures a rotational speed of a wing of the unmanned aerial vehicle, and the distance measuring device measures a distance between the unmanned aerial vehicle and a predetermined parking location; and the controller changes the direction and the magnitude of the current supplied into the electrified coil according to the rotational speed obtained by the rotational speed measuring device and/or the distance obtained by the distance measuring device.

More preferably, the controller receives a take-off instruction, and controls the electrified coil to be supplied with a forward current which is continuously increased, and the supporting magnetic field generates an upward thrust force that acts on the unmanned aerial vehicle; and when the thrust force acting on the unmanned aerial vehicle by the supporting magnetic field is equal to a gravity of the unmanned aerial vehicle, the forward current supplied into the electrified coil reaches its maximum, and an air gap is formed between the unmanned aerial vehicle and the landing platform.

Preferably, after the air gap is formed between the unmanned aerial vehicle and the landing platform, the wing of the unmanned aerial vehicle starts to turn; the forward current supplied into the electrified coil decreases with the increasing of the rotational speed of the wing of the unmanned aerial vehicle; and when the rotational speed of the wing of the unmanned aerial vehicle is equal to a preset rotational speed, the current supplied into the electrified coil decreases to zero.

More preferably, the controller receives a landing instruction, and controls the electrified coil to be supplied with a forward current which is continuously increased; and when the rotational speed of the wing of the unmanned aerial vehicle is zero and the distance measuring device detects that the distance between the unmanned aerial vehicle and the landing platform is zero, the controller stops electrifying the electrified coil.

Preferably, the controller receives a landing instruction, and the distance measuring device detects whether the distance between the unmanned aerial vehicle and the landing platform is within a landing allowable range; and if the distance between the unmanned aerial vehicle and the landing platform is within the landing allowable range, the rotational speed of the wing of the unmanned aerial vehicle keeps unchanged, and a reverse current is supplied into the electrified coil to drag the unmanned aerial vehicle to right above the predetermined parking location.

Preferably, the unmanned aerial vehicle take-off and landing control system further comprises an energy storage device provided in the unmanned aerial vehicle and a charge coil provided on an undercarriage of the unmanned aerial vehicle, wherein the energy storage device and the charge coil are electrically connected; when the unmanned aerial vehicle is flying, the energy storage device and the charge coil are disconnected; when the unmanned aerial vehicle is parking on the landing platform, the controller controls the electrified coil to be supplied with a charging current, the magnetic field assembly generates a varying charging magnetic field at the side of the landing platform, and the energy storage device and the charge coil are connected to charge the energy storage device.

Preferably, the distance measuring device comprises an infrared distance measuring device provided in the unmanned aerial vehicle and an infrared receiving device provided at the side of the landing platform; and a width of the infrared receiving device is greater than a width of the infrared distance measuring device.

Preferably, the magnet assembly comprises a permanent magnet, and the permanent magnet is provided on a corresponding contact surface between the undercarriage of the unmanned aerial vehicle and the landing platform; and the magnetic field assembly comprises an iron core provided at the landing platform, and the electrified coil is wound around the iron core.

In the unmanned aerial vehicle take-off and landing control system according to the above embodiment of the present disclosure, in the process of take-off or landing of the unmanned aerial vehicle, a uniform magnetic field is formed by varying the current of the electrified coil, and a thrust force that acts on the unmanned aerial vehicle is generated to supplement the lift force or resistance force in the process of take-off or landing, thereby improving the safety performance of the unmanned aerial vehicle is improved, reducing the energy consumption of the unmanned aerial vehicle when it is used, and prolonging the service life of the unmanned aerial vehicle.

The unmanned aerial vehicle take-off and landing control method that is provided by the present disclosure particularly comprises the following steps:

S1, the controller receives the take-off instruction, controls the electrified coil to be supplied with the forward current which is continuously increased; and when the thrust force acting on the unmanned aerial vehicle by the supporting magnetic field is equal to a gravity of the unmanned aerial vehicle, the forward current supplied into the electrified coil reaches its maximum, and an air gap is formed between the unmanned aerial vehicle and the landing platform;

S2, after the air gap is formed between the unmanned aerial vehicle and the landing platform, the maximum forward current supplied into the electrified coil is controlled by the controller to be unchanged, and the wing of the unmanned aerial vehicle starts to rotate; a rotational speed detection signal that is fed back by a rotational speed detecting device is inputted to an input end of the controller, and a controlling signal is outputted according to the inputted rotational speed detection signal to control the forward current supplied into the electrified coil to decrease with the increasing of the rotational speed of the wing of the unmanned aerial vehicle; when the rotational speed of the wing of the unmanned aerial vehicle is equal to a preset rotational speed, the current supplied into the electrified coil is controlled by the controller to decrease to zero;

S3, the controller receives a landing instruction, and the distance measuring device detects whether the distance between the unmanned aerial vehicle and the landing platform is within a landing allowable range;

S4, if the distance between the unmanned aerial vehicle and the landing platform is within the landing allowable range, the controller inputs a controlling signal to keep the rotational speed of the wing of the unmanned aerial vehicle unchanged, and controls the electrified coil to be supplied with a reverse current to drag the unmanned aerial vehicle to right above a predetermined parking location;

S5, the electrified coil is controlled by the controller to be supplied with a forward current which is continuously increased, to form a thrust force that acts on an unmanned aerial vehicle to supplement the loss of a resistance force caused by the decreasing of the rotational speed of the wing of the unmanned aerial vehicle; when the rotational speed of the wing of the unmanned aerial vehicle is zero and the distance measuring device detects that the distance between the unmanned aerial vehicle and the landing platform is zero, the controller inputs a controlling signal to stop electrifying the electrified coil; and S6, when the unmanned aerial vehicle is working, the energy storage device and the charge coil are disconnected; when the unmanned aerial vehicle is parking on the landing platform, the controller outputs a controlling signal, and controls the electrified coil to be supplied with a charging current, the magnetic field assembly generates a varying charging magnetic field at the side of the landing platform, and the energy storage device and the charge coil are connected to charge the energy storage device.

The control method according to the present disclosure reduces the energy consumption of the unmanned aerial vehicle in the process of take-off or landing, improves the safety performance of the unmanned aerial vehicle, and has the merit of good operability.

DETAILED DESCRIPTION

Figure 1:
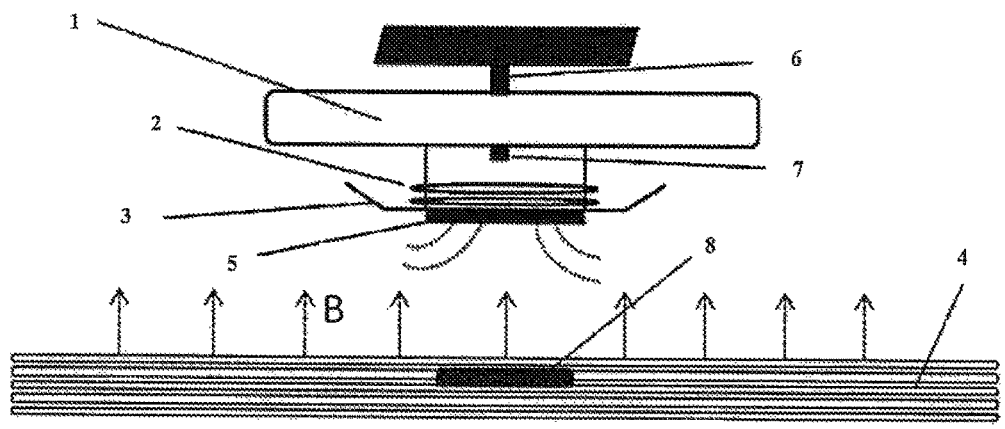
FIG. 1 is a schematic diagram of the structure of an unmanned aerial vehicle take-off and landing control system according to an embodiment of the present disclosure.
Figure 2:
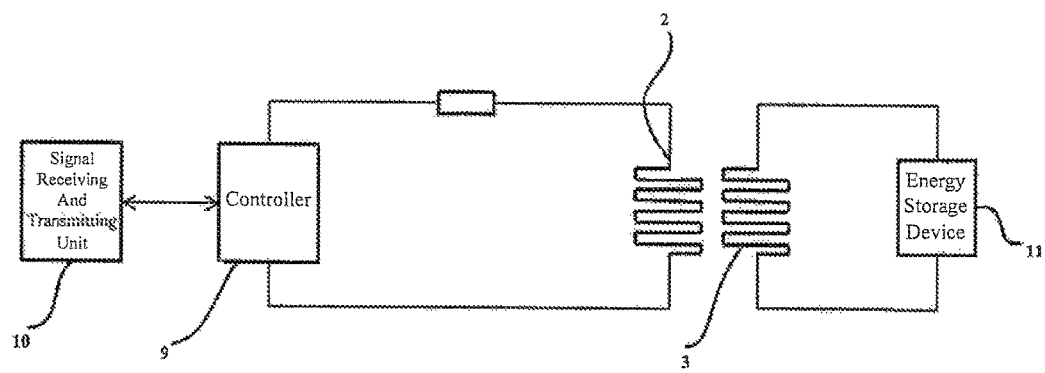
FIG. 2 is a schematic block diagram of an unmanned aerial vehicle take-off and landing control system according to an embodiment of the present disclosure.

As shown in FIGS. 1 to 2, the take-off and landing control system according to the present disclosure comprises a magnet assembly provided at the side of an unmanned aerial vehicle 1 and a magnetic field assembly provided at the side of a landing platform. Particularly, the magnet assembly is a permanent magnet 5 provided on the contact surface between the undercarriage of the unmanned aerial vehicle and the landing platform. The permanent magnet 5 has a small weight and stable magnetism. The magnetic field assembly comprises an iron core provided at the landing platform and an electrified coil 2 wound around the iron core. For a magnetic field assembly provided in particular environments such as the roof of a car, the electrified coil 2 is provided in a washer to avoid the influence of bottom magnetic leakage on other articles. A magnetic field is formed at the side of the unmanned aerial vehicle when the electrified coil 2 is electrified. As the magnetic field intensity of the side of the landing platform is much larger than the magnetic field intensity of the magnetic field formed by the permanent magnet 5, the magnetic field generated by the magnetic field assembly is uniform with respect to the unmanned aerial vehicle, and the unmanned aerial vehicle will not rollover or fall.

When a forward current is supplied into the electrified coil 2, the magnetic field assembly forms a supporting magnetic field at the side of the landing platform, and generates a thrust force that acts on the unmanned aerial vehicle. In the process of take-off, a resultant force is formed by the thrust force generated by the supporting magnetic field and the lift force of the unmanned aerial vehicle, and supplements the lift force generated by the rotation of the wing, thereby reducing the energy consumption in the process of take-off of the unmanned aerial vehicle. On the other hand, in the process of landing, as the weight of the unmanned aerial vehicle itself is small, the lift force decreases rapidly when it vertically lands and the flight speed is high. In order to prevent a plane crash in landing, the thrust force acting on the unmanned aerial vehicle by the supporting magnetic field and the resistance force form a resultant force, so that the force is applied to the unmanned aerial vehicle uniformly.

In the unmanned aerial vehicle take-off and landing control system of the present embodiment, a rotational speed measuring device 6 and an infrared distance measuring device 7 are provided at the side of the unmanned aerial vehicle, and a signal receiving and transmitting module 10 and a controller 9 are provided at the side of the landing platform. The rotational speed detection signal generated by the rotational speed measuring device 6 and the distance signal generated by the infrared distance measuring device 7 are outputted to the controller 9 via the signal receiving and transmitting module 10, as two independent controlling parameters of the controller 9.

Particularly, the unmanned aerial vehicle 1 receives a take-off instruction and outputs a take-off signal, and the signal receiving and transmitting module 10 receives the take-off signal and outputs it to the controller 9. The controller 9 controls the electrified coil 2 to be supplied with a forward current. At this point the wing of the unmanned aerial vehicle 1 does not rotate. The supporting magnetic field formed by the forward current generates an upward thrust force that acts on the unmanned aerial vehicle. The forward current supplied into the electrified coil 2 is controlled by the controller 9 to continuously increase. When the upward thrust force is equal to the gravity of the unmanned aerial vehicle 1, the forward current in the electrified coil 2 reaches its maximum, and an air gap is formed between the unmanned aerial vehicle 1 and the landing platform 4, so that the unmanned aerial vehicle 1 is in a magnetic levitation state. After the air gap is formed between the unmanned aerial vehicle 1 and the landing platform 4, the infrared distance measuring device 7 generates a distance detection value of the distance between the unmanned aerial vehicle 1 and the predetermined parking location and feeds it back to the input end of the controller 9 via the signal receiving and transmitting unit 10.

After the air gap is formed between the unmanned aerial vehicle 1 and the landing platform 4, the wing of the unmanned aerial vehicle starts to rotate, and the rotational speed measuring device 6 generates a rotational speed detection value and feeds it back to the input end of the controller 9 via the signal receiving and transmitting unit 10. Optionally, when the infrared distance measuring device 7 detects that the distance detection value of the distance between the unmanned aerial vehicle 1 and the predetermined parking location is a certain value, preferably, 0.5 meter, the wing of the unmanned aerial vehicle is controlled to start to rotate, to improve the safety. After the wing of the unmanned aerial vehicle starts to rotate, the forward current supplied into the electrified coil 2 is controlled by the controller 9 to decrease with the increasing of the rotational speed of the wing of the unmanned aerial vehicle. When the rotational speed of the wing of the unmanned aerial vehicle is equal to a preset rotational speed, the current supplied into the electrified coil 2 is controlled by the controller 9 to decrease to zero. At this point, the supporting magnetic field generated at the side of the landing platform disappears, and the unmanned aerial vehicle 1 operates in the original control mode.

When the unmanned aerial vehicle 1 is preparing to land, the remote controller sends a landing instruction. The unmanned aerial vehicle 1 receives the landing instruction and outputs a landing signal, and the signal receiving and transmitting module 10 receives the landing signal and outputs it to the controller 9. The controller 9 judges whether the unmanned aerial vehicle 1 is within a landing allowable range according to the distance detection value of the distance between the unmanned aerial vehicle 1 and the landing platform 4 that is generated by the infrared distance measuring device 7. The landing allowable range refers to a particular region on the landing platform 4 that is defined with the predetermined parking location as the circle center and a particular distance as the radius. If the controller 9 determines that the unmanned aerial vehicle 1 is within the landing allowable range, the controller 9 outputs a controlling signal to keep the rotational speed of the wing of the unmanned aerial vehicle unchanged, and the electrified coil 2 is supplied with a reverse current to form an attracting magnetic field to drag the unmanned aerial vehicle 1 to right above a predetermined location. When the unmanned aerial vehicle 1 is right above the predetermined location, an infrared receiving device 8 receives an infrared signal that is emitted by an infrared distance measuring unit 7, which indicates that the unmanned aerial vehicle 1 is right above the parking location and can land, to facilitate the operating of the user who cannot see the particular location of the unmanned aerial vehicle 1. The width of the infrared receiving device 8 is slightly greater than the width of the infrared distance measuring unit 7, and a certain landing error is allowed.

Subsequently, the electrified coil 2 is controlled by the controller 9 to be supplied with a forward current which is continuously increased. Simultaneously, the rotational speed measuring device 6 continues feeding the rotational speed detection signal of the wing of the unmanned aerial vehicle 1 back to the controller 9. The forward current logarithmically increases with the passage of time. According to the characteristics of logarithmic function, when the increment speed of the intensity of the supporting magnetic field reaches its maximum, and the thrust force that acts on the unmanned aerial vehicle 1 quickly increases to compensate for the loss of the lift force in the process of landing. The increment speed of the intensity of the supporting magnetic field decreases with the passage of time, so that the thrust force that acts on the unmanned aerial vehicle reaches its maximum and is stable when it is close to the predetermined parking location. When the rotational speed of the wing of the unmanned aerial vehicle decreases to zero and the infrared distance measuring device detects that the distance between the unmanned aerial vehicle 1 and the landing platform is zero, the controller 9 controls to stop electrifying the electrified coil 2, the supporting magnetic field disappears, and the unmanned aerial vehicle 1 lands smoothly.

The control system further comprises an energy storage device 11 and a charge coil 3 that are provided in the unmanned aerial vehicle 1. The charge coil 3 is provided on the undercarriage of the unmanned aerial vehicle. When the unmanned aerial vehicle 1 is flying, the energy storage device 11 and the charge coil 3 are disconnected. When the unmanned aerial vehicle 1 is parking on the landing platform 4, the energy storage device 11 and the charge coil 3 are electrically connected, the controller 9 controls the electrified coil 2 to be supplied with a charging current, and the magnetic field assembly generates a varying charging magnetic field at the side of the landing platform. An induction current is generated in the charge coil 3 by the continuously varying magnetic field, thereby an electromotive force that meets the specification of the energy supply of the unmanned aerial vehicle 1 is obtained, and the wireless charging of the unmanned aerial vehicle 1 is realized.

In the unmanned aerial vehicle take-off and landing control system according to the above embodiment of the present disclosure, in the process of take-off or landing of the unmanned aerial vehicle, a uniform magnetic field is formed by varying the current of the electrified coil, and a thrust force that acts on the unmanned aerial vehicle is generated to supplement the lift force or resistance force in the process of take-off or landing, thereby improving the safety performance of the unmanned aerial vehicle is improved, reducing the energy consumption of the unmanned aerial vehicle when it is used, and prolonging the service life of the unmanned aerial vehicle.

Figure 3:
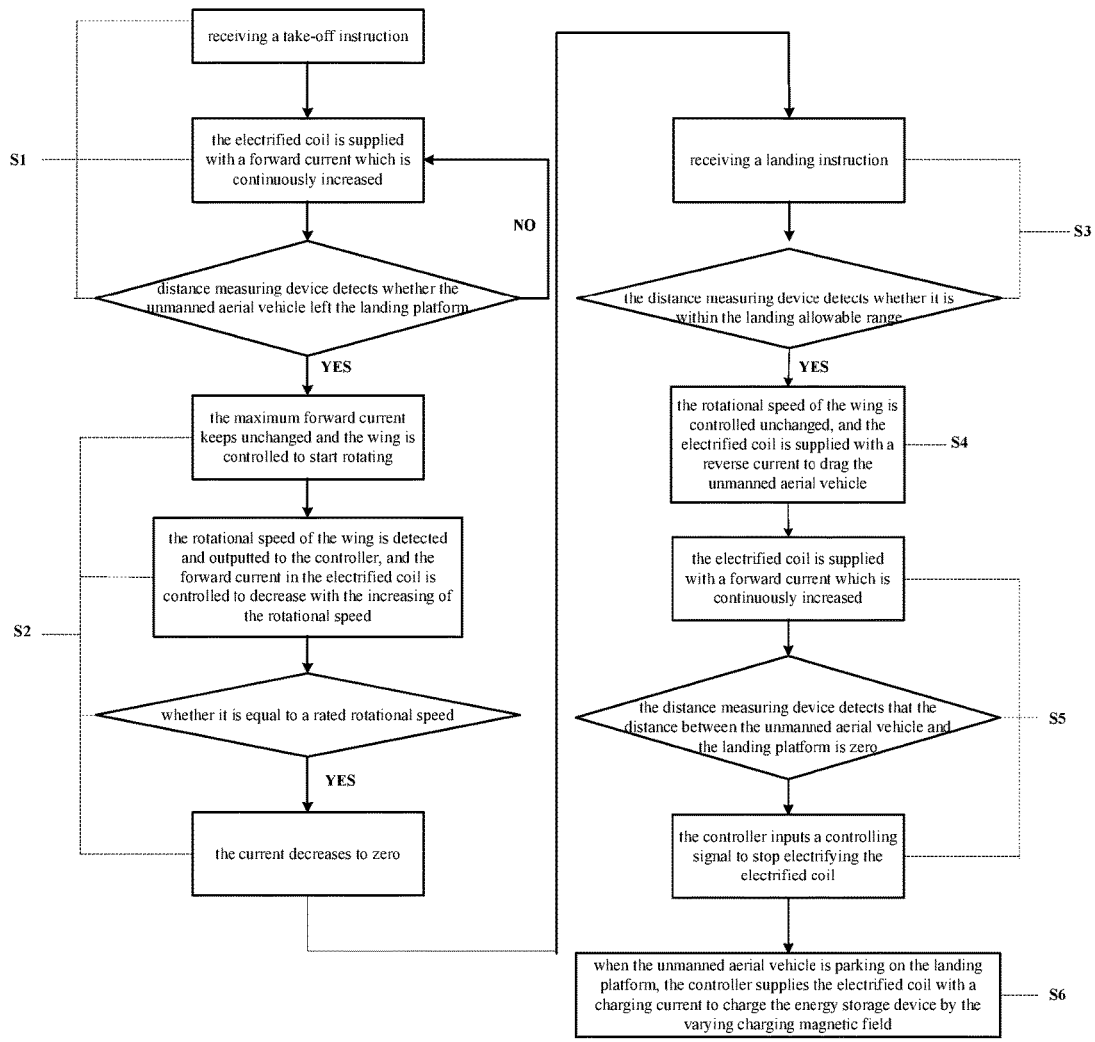
FIG. 3 is a flow chart of an unmanned aerial vehicle take-off and landing control method according to an embodiment of the present disclosure.

The present disclosure further provides a control method for controlling the take-off and landing of an unmanned aerial vehicle by using the unmanned aerial vehicle take-off and landing control system according to the above embodiment, particularly, as shown in FIG. 3, comprising the following steps:

S1, the controller receives the take-off instruction, controls the electrified coil to be supplied with the forward current which is continuously increased; when the thrust force that the supporting magnetic field acts on the unmanned aerial vehicle is equal to a gravity of the unmanned aerial vehicle, the forward current supplied into the electrified coil reaches its maximum, and an air gap is formed between the unmanned aerial vehicle and the landing platform.

S2, after the air gap is formed between the unmanned aerial vehicle and the landing platform, the maximum forward current supplied into the electrified coil is controlled by the controller to be unchanged, and the wing of the unmanned aerial vehicle starts to rotate; a rotational speed detection signal that is fed back by a rotational speed detecting device is inputted to an input end of the controller, and a controlling signal is outputted according to the inputted rotational speed detection signal to control the forward current supplied into the electrified coil to decrease with the increasing of the rotational speed of the wing of the unmanned aerial vehicle; when the rotational speed of the wing of the unmanned aerial vehicle is equal to a preset rotational speed, the current supplied into the electrified coil is controlled by the controller to decrease to zero.

S3, the controller receives a landing instruction, and the distance measuring device detects whether the distance between the unmanned aerial vehicle and the landing platform is within a landing allowable range.

S4, if the distance between the unmanned aerial vehicle and the landing platform is within the landing allowable range, the controller inputs a controlling signal to keep the rotational speed of the wing of the unmanned aerial vehicle unchanged, and controls the electrified coil to be supplied with a reverse current to drag the unmanned aerial vehicle to right above a predetermined parking location.

S5, the electrified coil is controlled by the controller to be supplied with a forward current which is continuously increased, to form a thrust force that acts on an unmanned aerial vehicle to supplement the loss of a resistance force caused by the decreasing of the rotational speed of the wing of the unmanned aerial vehicle; when the rotational speed of the wing of the unmanned aerial vehicle is zero and the distance measuring device detects that the distance between the unmanned aerial vehicle and the landing platform is zero, the controller inputs a controlling signal to stop electrifying the electrified coil.

S6, when the unmanned aerial vehicle is working, the energy storage device and the charge coil are disconnected; when the unmanned aerial vehicle is parking on the landing platform, the controller outputs a controlling signal, and controls the electrified coil to be supplied with a charging current, the magnetic field assembly generates a varying charging magnetic field at the side of the landing platform, and the energy storage device and the charge coil are connected to charge the energy storage device.

The control method according to the present disclosure reduces the energy consumption of the unmanned aerial vehicle in process of take-off or landing, improves the safety performance of the unmanned aerial vehicle, and has the merit of good operability.

Finally, it should be noted that the above embodiments are merely intended to describe the technical solutions of the present disclosure, rather than limiting them. Although the present disclosure is described in detail by referring to the above embodiments, a person skilled in the art should understand that the technical solutions disclosed by the above embodiments can be amended, and some parts of their technical features can be equivalently replaced, and these amendments or replacements do not deviate from the spirit and scope of the present disclosure.

What is claimed is:

1. An unmanned aerial vehicle take-off and landing control system, comprising:
   an unmanned aerial vehicle having a contact surface provided with a magnet assembly, the unmanned aerial vehicle having:
   a wing configured to rotate to generate lift force, and
   a rotational speed measuring device configured to generate a rotational speed detection value;
   a landing platform provided with a magnetic field assembly;
   an electrified coil provided in the magnetic field assembly;
   a controller;
   wherein the controller is configured to control the electrified coil to be supplied with a current, and the magnetic field assembly generates a supporting magnetic field to form a thrust force that acts on the magnetic assembly so the unmanned aerial vehicle is in a magnetic levitation state, and
   wherein the controller is configured to receive the rotational speed detection value and decrease the current supplied to the electrified coil when the rotational speed value is equal to a preset rotation speed value.

2. The unmanned aerial vehicle take-off and landing control system according to claim 1, further comprising a distance measuring device, wherein:
   the rotational speed measuring device is configured to measure a rotational speed of the wing of the unmanned aerial vehicle,
   the distance measuring device is configured to measure a distance between the unmanned aerial vehicle and a predetermined parking location, and
   the controller is configured to change a direction and a magnitude of the current supplied into the electrified coil according to the rotational speed measured by the rotational speed measuring device and/or the distance measured by the distance measuring device.

3. The unmanned aerial vehicle take-off and landing control system according to claim 2, wherein
the controller is configured to receive a take-off instruction with which to control the current supplied to the electrified coil to be a forward current which is increased, and thus control the supporting magnetic field generated by the magnetic field assembly such that the thrust force that the supporting magnetic field generated is an upward thrust force that acts on the unmanned aerial vehicle, and
the controller is configured to supply the electrified coil with a forward current wherein an air gap is formed when the upward thrust force acting on the unmanned aerial vehicle by the supporting magnetic field is equal to a gravity of the unmanned aerial vehicle, and the forward current supplied to the electrified coil reaches a maximum forward current.

4. The unmanned aerial vehicle take-off and landing control system according to claim 3, wherein:
the controller is configured to receive a landing instruction,
the distance measuring device is configured to detect whether the distance between the unmanned aerial vehicle and the predetermined parking location is within a landing allowable range, and
the controller is configured to control the current supplied to the electrified coil to be a reverse current to drag the unmanned aerial vehicle to right above the predetermined parking location and the rotational speed of the wing of the unmanned aerial vehicle is maintained unchanged if the distance between the unmanned aerial vehicle and the landing platform is detected to be within the landing allowable range.

5. The unmanned aerial vehicle take-off and landing control system according to claim 4, wherein:
the controller is configured to control the current supplied to the electrified coil to be a forward current which is increased after the unmanned aerial vehicle is dragged right above the predetermined parking location, and
the controller is configured to stop supplying the current to the electrified coil when the rotational speed of the wing of the unmanned aerial vehicle is measured by the rotational speed measuring device to be zero and the distance measuring device detects that the distance between the unmanned aerial vehicle and the predetermined parking location is zero.

6. The unmanned aerial vehicle take-off and landing control system according to claim 5, wherein:
the unmanned aerial vehicle further includes an energy storage device and a charge coil provided on an undercarriage of the unmanned aerial vehicle, the energy storage device and the charge coil being electrically connected, unless the unmanned aerial vehicle is flying during which time the energy storage device and the charge coil are disconnected,
the controller is configured to control the current supplied to the electrified coil to be a charging current when the unmanned aerial vehicle is parked on the landing platform, to control the magnetic field assembly to generate a varying charging magnetic field at a side of the landing platform, and to control the energy storage device and the charge coil to be connected to charge the energy storage device when the charging current is supplied.

7. The unmanned aerial vehicle take-off and landing control system according to claim 6, wherein the distance measuring device comprises an infrared distance measuring device provided in the unmanned aerial vehicle and an infrared receiving device provided at the side of the landing platform, and a width of the infrared receiving device is greater than a width of the infrared distance measuring device.

8. The unmanned aerial vehicle take-off and landing control system according to claim 7, wherein the magnet assembly comprises a permanent magnet, and the magnetic field assembly comprises an iron core and the electrified coil is wound around the iron core.

9. A control method for controlling take-off and landing of an unmanned aerial vehicle by using an unmanned aerial vehicle take-off and landing control system comprising the unmanned aerial vehicle having a contact surface provided with a magnet assembly, the unmanned aerial vehicle further having a wing configured to rotate to generate lift force, a rotational speed measuring device, an energy storage device, and a charge coil, the manned aerial vehicle take-off and landing control system further comprising a landing platform provided with a magnetic field assembly, an electrified coil provided in the magnetic field assembly, a distance measuring device, and a controller, wherein the controller is configured to control the electrified coil to be supplied with a current, and the magnetic field assembly generates a supporting magnetic field to form a thrust force that acts on the magnetic assembly so the unmanned aerial vehicle is in a magnetic levitation state, the method comprises the following steps:
receiving, by the controller, a take-off instruction, which is used by the controller to control the current supplied to the electrified coil to be a forward current which is increased; and when the thrust force acting on the unmanned aerial vehicle by the supporting magnetic field is equal to a gravity of the unmanned aerial vehicle, the forward current supplied to the electrified coil reaches a maximum forward current, and an air gap is formed between the unmanned aerial vehicle and the landing platform;
controlling, by the controller and after the air gap is formed between the unmanned aerial vehicle and the landing platform, the maximum forward current supplied to the electrified coil to be unchanged, and the wing of the unmanned aerial vehicle to start to rotate, feeding back a rotational speed detection signal by the rotational speed measuring device to an input end of the controller, and the controller providing a controlling signal according to the inputted rotational speed detection signal to control the forward current supplied to the electrified coil to decrease with the increasing of the rotational speed of the wing of the unmanned aerial vehicle, and when the rotational speed of the wing of the unmanned aerial vehicle is equal to a preset rotational speed, the controller controlling the current supplied to the electrified coil to decrease to zero;
receiving, by the controller, a landing instruction, and detecting by the distance measuring device whether a distance between the unmanned aerial vehicle and the landing platform is within a landing allowable range;
after detecting by the distance measuring device that a distance between the unmanned aerial vehicle and the landing platform is within the landing allowable range, providing by the controller a controlling signal to keep the rotational speed of the wing of the unmanned aerial vehicle unchanged; and to control the current supplied to the electrified coil to be a reverse current to drag the unmanned aerial vehicle to right above a predetermined parking location;

controlling, by the controller, the current supplied to the electrified coil to be a forward current which is increased, such that the thrust force formed by the supporting magnetic field acts on the unmanned aerial vehicle to supplement the loss of a resistance force caused by the decreasing of the rotational speed of the wing of the unmanned aerial vehicle, and when the rotational speed of the wing of the unmanned aerial vehicle is zero and the distance measuring device detects that the distance between the unmanned aerial vehicle and the landing platform is zero, providing by the controller a controlling signal to stop supplying the current to the electrified coil; and disconnecting, when the unmanned aerial vehicle is working, the energy storage device and the charge coil, and when the unmanned aerial vehicle is parked on the landing platform, providing by the controller a controlling signal to control the current supplied to the electrified coil to be a charging current, to control the magnetic field assembly to generate a varying charging magnetic field at a side of the landing platform, and to control the energy storage device and the charge coil to be connected to charge the energy storage device when the charging current is supplied.

* * * * *